United States Patent [19]
Becker

[11] Patent Number: 6,157,725
[45] Date of Patent: Dec. 5, 2000

[54] SOUND SYSTEM FOR A MOTOR VEHICLE AND METHOD FOR DEFINING A FUNCTIONAL SCOPE OF A SOUND SYSTEM

[75] Inventor: Michael Becker, Philippsburg, Germany

[73] Assignee: Becker GmbH, Karlsbad, Germany

[21] Appl. No.: 08/987,889

[22] Filed: Dec. 10, 1997

[30] Foreign Application Priority Data

Dec. 10, 1996 [DE] Germany ............... 196 51 308

[51] Int. Cl.[7] .................................................. H04B 1/00
[52] U.S. Cl. ............................................................. 381/86
[58] Field of Search ................................. 381/77, 86, 119, 381/56, 58, 82, 302; 340/901, 902, 500

[56] References Cited

U.S. PATENT DOCUMENTS

| | | | |
|---|---|---|---|
| 5,073,943 | 12/1991 | Chapman | 381/86 |
| 5,218,643 | 6/1993 | Nagashima | 381/86 |
| 5,243,640 | 9/1993 | Hadley et al. | 381/86 |

*Primary Examiner*—Vivian Chang
*Attorney, Agent, or Firm*—Herbert L. Lerner; Laurence A. Greenberg; Werner H. Stemer

[57] ABSTRACT

A sound system for a motor vehicle and a method for defining a functional scope of a sound system include a control unit, an input unit for operating the system, a display unit, a unit for generating source data in the form of audio data, an amplifier unit for amplifying the source data, one or more speakers, and a bus system that assures transmission of the source data and control data for controlling the units among the individual units. At least one unit other than the control unit of the system has a memory assigned to it, in which the functional scope of that unit is represented. The functional scope can be transmitted through the bus to the control unit, and the transmitted functional scope can be used in the control unit for at least partially forming the functional scope of the entire system. The control unit, the input unit and the display unit are connected to one another in such a way that through the use of the display unit, operating menus required for operating the entire system can be shown in accordance with the functional scope of the entire system, and the operation of the system can be performed with the aid of the input unit on the basis of displays in the display unit.

32 Claims, 1 Drawing Sheet

SOUND SYSTEM FOR A MOTOR VEHICLE AND METHOD FOR DEFINING A FUNCTIONAL SCOPE OF A SOUND SYSTEM

BACKGROUND OF THE INVENTION

Field of the Invention

The invention relates to a sound system for a motor vehicle, having a control unit, an input unit for operating the system, a display unit, a unit for generating source data in the form of audio data, an amplifier unit for amplifying the source data, one or more speakers associated with the amplifier unit, and a bus system that assures the transmission of the source data and control data for controlling the units among the individual units. The invention also relates to a method for defining a functional scope or range of functions of a sound system.

One such sound system is generally described in Published European Patent Application 0 725 522 A. Such a system is also described in the publication "OCC 8001" CONAN "Optical Transceiver", C & C Electronics Ltd., 1996. The sound systems shown therein have a control unit, also known as a head unit, which accomplishes the control of the entire system and which enables the outputting of information through the display unit, the operation of the system through the input unit by the user, and the conversion into appropriate control commands for the individual units of the sound system. The known sound systems for motor vehicles have a rigid system configuration, which allows the integration of only certain units, provided by the control unit or head unit, into the system. Therefore, the known sound systems for motor vehicles prove to be relatively inflexible, not very user-friendly, and very expensive in the event of adaptation of the system to new conditions. Adaptation to new additional components of different kinds is assured in the known sound systems by providing that along with the new unit, a new control unit or head unit must be integrated into the system as well, which involves the disadvantages already described.

SUMMARY OF THE INVENTION

It is accordingly an object of the invention to provide a sound system for a motor vehicle and a method for defining a functional scope of a sound system, which overcome the hereinafore-mentioned disadvantages of the heretofore-known devices and methods of this general type and in which modifications to the system can be carried out more simply, more inexpensively, and more reliably, as far as possible.

With the foregoing and other objects in view there is provided, in accordance with the invention, a sound system for a motor vehicle, comprising a control unit; an input unit for operating the system; a display unit; a unit for generating source data in the form of audio data; an amplifier unit for amplifying the source data; at least one speaker; and a bus system assuring transmission among the individual units of the source data and control data for controlling the units; at least a given one of the units other than the control unit having an associated memory representing a functional scope of the at least one given unit, the functional scope to be transmitted through the bus system to the control unit, and the transmitted functional scope to be used in the control unit at least partially for forming a functional scope of the entire system.

The control unit is capable of being supplied through the bus system from one or more or all of the other units of the system with the possible functional scope of this unit or units, which is stored in the memory assigned to that unit or units, and it is capable of forming the functional scope of the total system from the sum of the individual functional scopes. This functional scope of the total system always forms a portion of all of the functional scopes of the individual units of the sound system. The sound system according to the invention has a structure which stores the functional scope of the individual units at decentralized points, and in which a functional scope of the entire system for controlling the entire system is stored at a central point, preferably in the control unit, with this functional scope being formed from the various individual functional scopes of the individual units.

Unlike the prior art, upon a modification, such as adding a new unit to the sound system that was not originally provided, the control unit or head unit is no longer replaced. Instead, it is retained in its form and assures that the added functional scope of the additional unit will also be used to form the functional scope of the entire system through the use of a transmission of the functional scope contained in the additional unit, through connecting lines from the additional unit to the control unit. As a result, the modifications of the entire system are taken into account, and the user is furnished with the modifications in accordance with new, altered operating possibilities and corresponding functionalities of the system. Therefore, to the extent needed, a new operating guide for operating the entire system is made available in accordance with the new functional scope of the entire system. It is optionally associated with altered displays in the display unit or altered assignments of commands with input keys of the input unit. Thus, within the context of transmitting the additional functional scope, the operating guide for the additional functions of the system can also be jointly transmitted in accordance with the additional functional scope.

Through the use of this embodiment of the sound system, it is possible to successfully adapt the functional scope of the sound system to new requirements reliably, simply and inexpensively. Complicated and expensive additional devices and new devices are not needed in this case.

An especially advantageous, flexible sound system is obtained if many units have memories assigned to them, in which the functional scopes specific to these units are stored, and from which functional scopes the total functional scope of the system is formed. Either all of the functionalities are to be used, or only certain portions of the functionalities of the individual units are to be transmitted to the functionality of the entire system. This partial transmission can be carried out automatically by the control unit or by the user, or by an additional integrated unit intermittently connected to the sound system through the bus line.

The versatility of the system can thus be configured flexibly and freely in an especially advantageous way to suit the particular demands of the user in accordance with the various units available for generating audio data or the units for amplifying these data as well as the speakers. This may also be the case if no new units are introduced into the system but instead only the actually used portions of the individual functional scopes are adapted to new requirements by expansion or downsizing.

In accordance with another feature of the invention, the memory assigned to one unit is constructed as part of that unit. This assures that the memory contents need not be transmitted over the bus system to the unit with the possible functional scope of that unit, with subsequent transmission of the functional scope from the unit back to the control unit again over the bus line. In the case of an optical bus system, which has especially great advantages in terms of EMV stability and weight reduction, an expensive electrical-optical converter between the memories and the units that are absolutely necessary can be dispensed with, which makes the system less vulnerable to interference and thus increases the reliability of operation and therefore the ease of use of the system. Moreover, this feature proves to be especially economical.

In accordance with a further feature of the invention, the memory is constructed as part of a computer unit, which is connected through the bus system to the unit assigned to the memory, which is constructed as an independent computer unit, spatially separated from the other units, and which as needed can deliver the functional scope of the unit assigned to the memory directly or indirectly to the control unit through the bus system, for forming the functional scope of the entire system.

In accordance with an added feature of the invention, the use of a computer unit proves to be especially advantageous in this respect, because it has very flexible memory structures, into which other, altered functional scopes can easily be written through different interfaces of the computer unit. This also makes it possible to provide an optionally central computer unit with a corresponding memory in the system that assures the central administration of the various functional scopes of the individual units and as needed transmits them directly or indirectly to the control unit through the bus system, for forming the new, modified functional scope of the entire sound system.

In accordance with an additional feature of the invention, the computer unit is disconnectably connected to the system. The system can be based on a new, modified total functional scope by using a borrowed specific computer unit on the order of a temporary integration into the system through a prepared interface in the bus system. This makes the system very flexible and economical for the user. Through the use of such a system, a new functionality, such as a new type of 3-D sound, can be very simply input as a new functionality of the system, including the operating guide associated with this functionality, and thus an adaptation to the individual needs of the user can be made in a very simple, economical and flexible way. Therefore, instead of the necessity of replacing complete units or the entire sound system, it is possible in many cases to simply reprogram the system, which also has advantages in terms of wasting resources and avoiding waste, besides the above advantages.

In accordance with yet another feature of the invention, an especially simple and convenient way of operating the sound system is achieved by providing that the control unit, the input unit and the display unit are connected to one another in such a way that in accordance with the functional scope of the entire system, specific operating menus are shown on the display unit which make it possible to operate the system in a goal-oriented, simple way with the aid of the input unit, on the basis of the displays in the display unit. The operating menus may be specific for the individual functionalities of the individual units or may be specific for the way in which a new, modified functional scope of the entire system is formed. It is possible to provide the display unit with an additional speech output, which markedly increases the ease and security of use of the entire system. The input unit may also be constructed as a speech-controlled input unit, with comparable advantages.

In accordance with yet a further feature of the invention, the input and display units are combined into a single unit.

In accordance with yet an added feature of the invention, the display unit is subdivided into individual segments with which individual keys of the input unit are spatially associated and each of which represent operating functions allocated to the associated key, and the corresponding keys and segments are triggered by the control unit on the basis of the functional scope of the entire system in such a way that the functions allocated to the keys and represented in the associated segment can be tripped by actuating the keys.

Through the use of these embodiments it is possible to construct the sound system very simply, with as few interfaces and units as possible, which simplifies the administration of the entire system and the control of the individual units and also simplifies supplying the requisite energy to the system, thus making the system less vulnerable to disturbances. This provides an increased amount of operating reliability and an increased amount of simplification of system operation. In the embodiment described, it is possible for a central unit, in the form of a man-machine interface including an input unit and a display unit in the vehicle, to be accommodated preferably in the dashboard, and all of the other units, such as a tuner, CD player, video player or the like, to be accommodated in the motor vehicle at the optimized position adapted to their function or to the capabilities of the vehicle, and to connect them with one another through the bus system in such a way that the requisite control and source data are transmitted in a targeted way. It is thus possible, for instance, to place the radio tuner or TV tuner at a location which is intrinsically the ideal location in the region of the antenna, and to carry only the source data output by these elements to the corresponding amplifier and to the output unit. The control is effected in this case through the central unit, that is the man-machine interface, which assures the user the capability of operating all of the system components with their various functional scopes. If the functional scopes of the system change from a change in the functional scopes of individual components or by adding or removing individual components, the described system according to the invention can be reconfigured especially simply and reliably.

In accordance with yet an additional feature of the invention, other multimedia data, in particular video data, can be transmitted along with the audio data, and corresponding units for generating these multimedia data and corresponding units for displaying these multimedia data are provided. Examples of units for generating multimedia data are in particular DVD players, CD ROM readers or navigation units, and examples of units for displaying these multimedia data are LCD displays, for instance. It is precisely because of the manifold nature and highly dynamic development in the multimedia field, with its specific multimedia data, that the specific information scopes of the various units, including the manner in which these units are operated, illustrates the particular advantage of the system of the invention, since it can react flexibly at any time to any possible modifications of new devices in the multimedia field and its specific developments, and the sound system can adapt simply and flexibly to requirements.

In accordance with again another feature of the invention, there is provided a plurality of units for generating audio and/or multimedia data. The flexibility of the system is demonstrated all the more as the number of units for generating audio and/or multimedia data becomes greater, since modifications occur much more often from replacement of the device by the user in such systems, thus changing the functional scope, than in systems having only a single unit for generating audio and/or multimedia data. In such systems, the user can optionally define the functional scope of the entire system in accordance with his or her concepts and make the corresponding control commands and operating commands the basis for it in the future for operating the system.

In accordance with again a further feature of the invention, in systems with a plurality of amplifier units for amplifying the audio source data, the particular advantages of the system of the invention are especially apparent, because precisely these amplifier units have many different functionalities, especially when they each have units specifically assigned to them for converting the amplified source data into sound waves. This is all the more true since each amplifier unit, for each speaker assigned to it, can be furnished with specific source data, adapted to the location and other properties of the speaker and amplified specifically, which can be expressed in variable transit time delays, predistortion, and the like. If for any reasons any component, in particular a unit for converting the amplified source data, is modified, then the individual functional scopes of the amplifier unit can be adapted in such a way that the entire sound system, with the new, modified unit for converting the amplified source data into sound waves, generates the most ideal possible perception of sound for the user. Thus the system of the invention also makes it possible to change the functional scope in such a way that for certain positions in the vehicle, which can be selected by the user, a virtually ideal acoustical space can be established, utilizing the various amplifier parameters such as fader, balance, delay values, predistortion, and the like. Each new set of parameters represents a modified functional scope, which can be used especially simply and flexibly in the system of the invention. These advantages are obtained all the more if each unit for converting the amplified source data into sound waves is assigned its own amplifier unit, or in other words if so-called active speakers are used. Thus, depending on the type of use of the active speakers, these speakers may each be assigned a specific functional scope as their own functional scope, which then according to the invention is used entirely or in part to form the functional scope of the entire system.

In accordance with again an added feature of the invention, there is provided a timer, which assures the generation of the functional scope of the entire system from the functional scopes of the individual units, after a predetermined period of time elapses. Automatic generation of the functional scope of the entire system at regular time intervals is provided by the use of this system, which enables very reliable or safe, simple manipulation of the system and of the possibilities of the system.

In accordance with again an additional feature of the invention, the predetermined period of time is adjustable, so that the various needs of the user can be taken into account. If the user will want to adapt the system relatively often by adding or replacing individual components or removing individual components or simply adapting it to changes in his or her own wishes, then he or she will set a shortened predetermined period of time, while a user who has made no changes or practically no changes will set a long period of time in the system until the system is reconfigured. Through the use of this adjustable, predeterminable period of time, the user-friendliness of the system is assured in a special way, since the system, by recourse to the functional scopes of the individual units and components of the system, automatically defines the functional scope of the entire system without any activity on the part of the user and forms the total functional scope from the individual functional scopes. Moreover, such a system proves to be especially reliable, since the defining of the new functional scope always precedes within fixed courses, without limiting the flexibility of the system, or in other words by taking account of changes in the most various ways.

In accordance with still another feature of the invention, the activation of the entire audio system or of each individual unit is detected, and the formation of the functional scope of the entire system from the functional scopes of the individual units is tripped through the use of this activation. In this respect care must be taken to ensure that adding a unit is equivalent to turning on this unit. Through the use of this specific way of tripping the formation of the total functional scope, it is assured in a simple way that at reduced effort and expense of administration, a total functional scope adapted to the individual components is always available, which is automatically adapted to the altered conditions, especially when further components are added, or in other words when individual components are replaced by being removed and others then added. A very flexible system is thereby assured, and because of the reduced administration effort it is reliable in its function. This system is distinguished in particular in that it is nonfunctional to its full scope only for a very limited time, especially upon activation, because within this time the entire functional scope must first be formed, so that operating the system during this period is impossible or only limitedly possible.

A system that is especially suitable as a total system is one which can be made to form the total functional scope of the entire system through the use of the operating unit. If the user has a need to change the functional scope of the sound system or to adapt to altered properties, then he or she can trip the forming of the functional scope of the entire system by actuating one or more operating elements of the operating unit. This assures that only when it is necessary is the formation of the functional scope tripped, and therefore the system is only hindered in its function for a short time. Thus the functionality of the entire system is assured over virtually the entire time. Reliable, flexible adaptation to requirements and user wishes is also excellently well assured in the system.

In accordance with still a further feature of the invention, the system is capable, at the instigation of the user, of enabling the outputting of the functional scopes of the entire system and the functional scopes of the individual units and/or all of the units, through the display unit.

In accordance with still an added feature of the invention, it has also proved to be advantageous to provide suitable operation guidance through the use of the operating unit and the display unit, to assure that individual partial functional scopes or even entire functional scopes of individual components are selected for use in forming the functional scope of the entire system. After the selection of the individually selected functional scopes of the individual units has been concluded, the total functional scope of the system is then formed, as a result of which the operating and display unit are assigned menus and functionalities corresponding to the new total functional scope, and the control unit and the individual units are also then only assured the control commands relevant to the limited, newly formed total functional scope of the system, and thus relevant functionalities for the functionalities of the new total functional scope of the system. The system can thus be adapted very simply in accordance with user wishes, and the control and administration activity can be reduced to what is necessary for the desired functional scope. Therefore, it is no longer necessary to support many functionalities of the system that the user does not wish to have. The reliability of operation and function of the system can be increased markedly as a result, without limiting the flexibility of the system.

In accordance with still an additional feature of the invention, the system may be used in a mobile home, house or apartment as well as in a motor vehicle, since comparable problems arise there as well, particularly when further components are added to a system that has units connected through a bus system. Therefore, the comparable advantages are demonstrated, especially whenever individual components are expanded, such as if an additional room in the apartment is to be equipped with units for converting audio source data into sound waves and possibly with amplifiers. Upon such a modification, the system should be adapted to the new requirements as simply, reliably, quickly and flexibly as possible. In this sense, the use of the sound system for a motor vehicle proves to be especially advantageous in the other environments as well.

With the objects of the invention in view there is also provided a method for defining a functional scope of a sound system, which comprises providing a control unit, an input unit for operating the system, a display unit, a unit for generating source data in the form of audio data, an amplifier unit for amplifying the source data, at least one speaker, and a bus system assuring transmission among the individual units of the source data and control data for controlling the units; providing at least a given one of the units other than the control unit with an associated memory representing a unit-specific functional scope of the at least one given unit; transmitting the functional scope through the bus system to the control unit; using the transmitted functional scope in the control unit at least partially for forming a functional scope of the entire system; furnishing the control unit with its unit-specific functional scope from the memories associated with the individual units upon a modification of the system for generating source data, in particular by adding a further unit, and upon an attendant modification of the functional scope of the system; at least partly combining the unit-specific functional scopes into a new total functional scope of the entire system; and subsequently triggering the individual units with the control unit in accordance with the total functional scope, and allocating the generated source data to the individual corresponding units accordingly.

In accordance with another mode of the invention, there is provided a method for defining the functional scope of a sound system which comprises supplying data from the control unit to the input unit and the display unit in accordance with the total functional scope, for permitting a user of the sound system to individually adjust various parameters of the functions of the system, such as volume, base, treble, fader, balance and equalizer.

In accordance with a further mode of the invention, there is provided a method for defining the functional scope of a sound system which comprises supplying data from the control unit to the input unit and the display unit in accordance with the total functional scope, for permitting a user of the sound system to call up individual functions of the individual units for generating source data of the system, such as play, change track, repeat, fast forward, rewind, change frequency, change frequency band, mute, activate/deactivate traffic radio reports, start station scan and activate/deactivate RDS functions, through appropriate operating menus.

Other features which are considered as characteristic for the invention are set forth in the appended claims.

Although the invention is illustrated and described herein as embodied in a sound system for a motor vehicle and a method for defining a functional scope of a sound system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
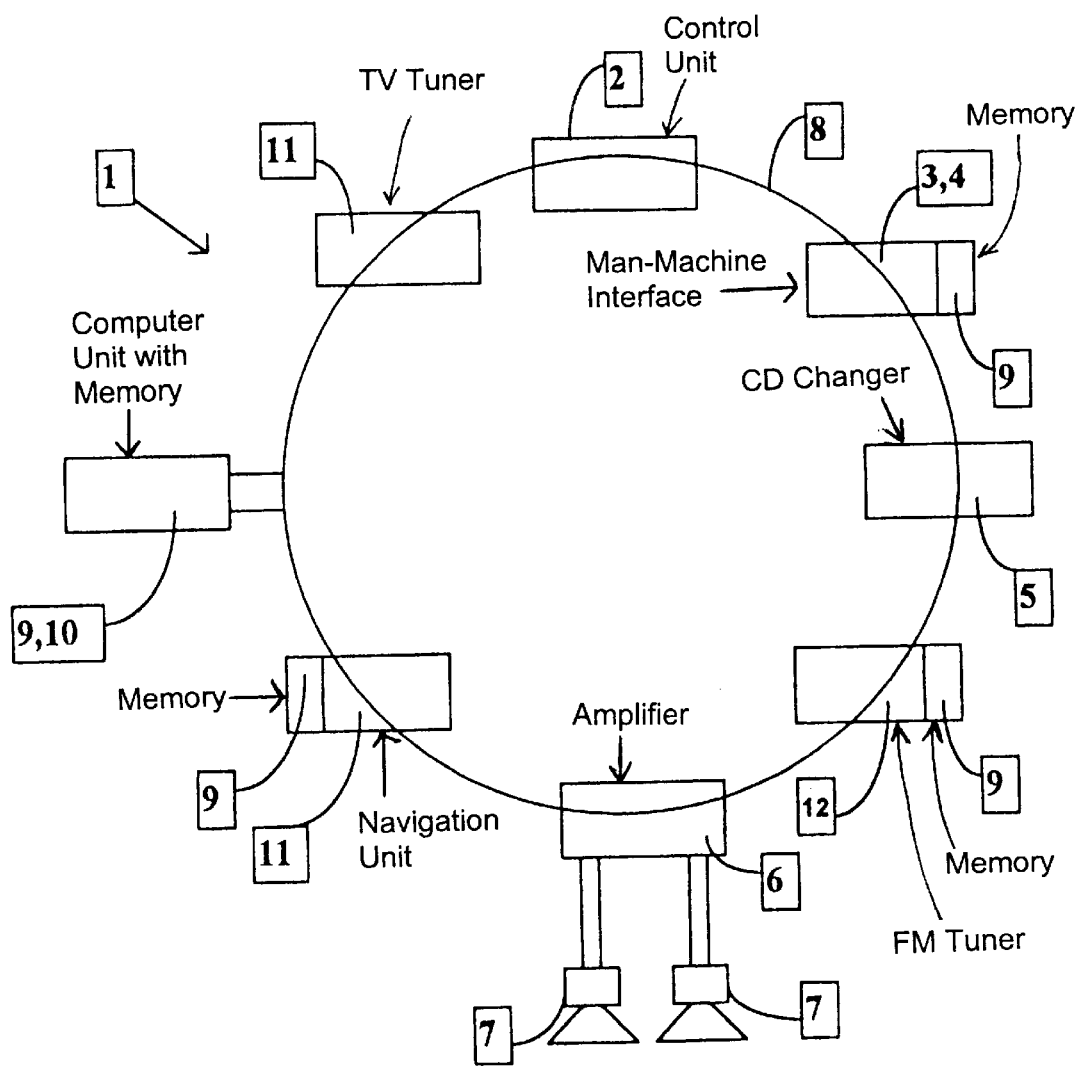
FIG. 1 is a schematic and block circuit diagram of a sound system for a motor vehicle having units connected through a bus system with a ringlike topology.

Referring now to the figures of the drawings in detail and first, particularly, to FIG. 1 thereof, there is seen an example of a sound system 1 for a motor vehicle which has a control unit 2, an input unit 3 and an output unit 4 combined into one device which additionally has a memory 9 and which is also known as a man-machine interface MMI, a CD changer 5, an FM tuner 12 with an associated memory 9, an amplifier unit 6 with two speakers 7 connected thereto, a navigation unit 11 with an associated memory 9, a computer unit 10 with an integrated memory 9, and a TV tuner 11. These individual components of the sound system 1 are connected to one another in a ring through a bus system 8.

Control, audio and multimedia data are all transmitted through the bus system 8. The individual components 3, 4, 5, 12, 6, 11, 10 are triggered in accordance with their functionalities, or supplied with the necessary data for their function in the system, through the use of the control unit 2 of the sound system 1.

For instance, the MMI 3, 4, 9 is triggered in such a way that the output unit or display 4 is subdivided into individual segments, which are spatially and functionally associated with individual keys of the input unit, and that in the segments a representation of the operating function of the key associated with this segment is typically displayed in the form of a menu. The function shown in the associated segment of the display unit 4 is tripped by actuating one of the keys. These functions can be extremely versatile in nature, for example increasing the volume, decreasing the volume, turning the loudness on or off, the surround on or off, the system off, the sleep mode on, amplifying or reducing the base, shifting the balance to the left or right, switching over to the TV tuner, starting the navigation input mode, starting equalizing programming, and many others. Through the use of this representation, the user can operate the entire system 1 through the single central combined input unit 3 and display unit 4. The data required for the representation and operation are stored in the memory 9 of the MMI. In addition, however, not only the current data, that is the current operating and display scope, but all possible data that are relevant to the MMI in its most general display and operating capability, are stored in memory. These general data thus exhibit the fundamental possibilities and thus also show the functional scope of the MMI. This functional scope or range of functions is not necessarily identical to the currently active functional scope.

This is correspondingly applicable to the other units for generating source data, such as the FM tuner 12 with the associated integrated memory 9 and the navigation unit 11 with its integrated memory 9, which is preferably constructed as a CD ROM and can therefore have a comprehensive functional scope. This functional scope includes not only the data for the possible functional scope of the navigation unit 11 but also the data for the functional scope of the TV tuner 11. Since it is possible to replace the CD ROM as a memory base, the possible functional scope can very easily be changed by making a kind of software update.

The illustrated sound system also has the computer unit 10 with the integrated memory 9. This computer unit 10 is connected to the bus system 8 through a non-illustrated disconnectable interface and can exchange data with the other units of the system 1 through this bus system. The possible functional scopes of the CD changer 5 and the amplifier 6 and optionally of the speakers 7 as well, are stored in the memory 9 of the computer unit 10, for instance. Modified or new functional scopes for individual units of the system can be input to the computer unit 10 and stored in its memory 9 as needed through an existing, further-standardized interface, such as an RS 232. Since the computer unit 10 is disconnectably connected to the bus system, system testing can also be carried out at any time and very simply, using the computer unit, by regular servicing and integrated adaptation of the possible functional scopes. In that case, these possible functional scopes are either associated completely or with a limited scope with individual memories 9 of the system and are stored in memory there.

On the basis of the functional scope of the entire system 1, which is formed from the individual functional scopes of the individual system components that are also known as units, defined operating menus and command sequences to the operating elements are associated with the input unit 3 and the display unit 4 which are combined into the central MMI, and the user can undertake the operation of the system on the basis thereof. The set of control commands is also selected among the individual components in accordance with the functional scope, so that less expense for administration and organization is then necessary for the operation of the system. This also increases operating reliability, since newer interactions between individual system states and corresponding functionalities need to be taken into account.

If one of the units 3, 4, 5, 12, 6, 7, 11 is removed from the system 1 or replaced by another unit, or if an additional unit is added, then this change in the system is ascertained by the control unit 2. After that, a method sequence for defining the functional scope of the sound system 1 is tripped automatically. In it, all of the functional scopes of the individual units of the system are detected centrally in order, through the bus system 8, and the functional scope of the entire system 1 is formed from the individual functional scopes which are detected. This can be done by adopting all of the individual functional scopes of individual units, or by adopting some of them. The decision as to which functionalities of a unit will be adopted in the functional scope of the entire system can be made on the basis of the interactions among the individual units, or by individual choice made by the user of the system 1.

One example for a limiting combination of units would be a balance or fader function, if the entire system has only a single speaker 7. In that case, the control unit 2 would recognize that the fader or balance functionality of the amplifier unit 6 in the current system configuration with a single speaker 7 cannot be allowed and therefore cannot be adopted for the functional scope of the entire system 1. Limiting factors may also be based on the properties of individual units.

Furthermore, by actuating a certain key or combination of keys of the input unit 3, the user of the system can trip a change in the functional scope without intervention into the individual units of the system—replacing, removing or adding units. The user can then define a functional scope that is convenient to himself or herself. This is then performed by a corresponding selection of the individual functionalities of the individual units of the system, using the input or operating unit 3 and the display unit 4. The possible functionalities are displayed in the display unit 4 and selected for adoption in the functional scope of the entire system 1 by specific actuation of the keys of the input or operating unit 3. This is done for all of the units having a functional scope which is freely selectable. It is also possible for only the changes in the existing functional scope of the entire system to be input. In other words, individual functionalities are deleted from the functional scope or new functionalities are added to the existing functional scope, in accordance with user wishes. Based on the newly defined functional scope of the system, the operating menus corresponding thereto are shown in the display unit 4, the command scopes corresponding thereto are assigned to the keys of the operating unit 3, and the control commands corresponding to this functional scope are exchanged between the individual units, and in particular between the control unit 2 and the specific unit.

This capability assures that each user can display a functional scope of the entire system in accordance with his or her own needs, without needing to have recourse to other new components. Thus, because of the individual capability of defining the functional scope, one and the same sound system can have completely different appearances and different modes of behavior. One user may be a complete purist in how he or she operates the sound system, and therefore all he or she wants to do is adjust the volume and choose the signal source. He or she would be irritated by any further functionality, and this purist type of functional scope would be most appealing to that person. Another user might want every possible type of intervention and functionality of every individual system unit available to him or her, and he or she will therefore adopt all of the possible functionalities in the functional scope of the entire system. The purist type of user would be completely overwhelmed by such a system, while the other kind of user would find it quite appealing. This is especially true since this system gives the user the capability of replacing individual components with other components having a larger functional scope at any time, or adding additional components and thereby adapting the functional scope simply and reliably to current needs without complicated intervention into the system. For instance, it is possible to replace the previous simple single-color, small-area display unit with a multicolor display, which thus permits completely different, more-convenient operating menus and thus makes the system easier to use. This adaptation of the functional scope is always carried out on the basis of the communication of the individual units with one another through the bus system 8. A highly flexible, economical system that can be modified reliably and which can be adapted easily to individual needs, is created through the use of the illustrated sound system.

What is claimed is:

1. A multimedia system for a motor vehicle, comprising:
   a control unit with a control unit memory;
   a display and input unit having a changeable operating menu for operating a multimedia system;
   at least one individual multimedia unit with an associated individual multimedia unit memory containing a functional scope of said at least one individual multimedia unit; and a bus system connected to said control unit, said display and input unit, and said at least one individual multimedia unit, said control unit formed to detect the functional scope of said at least one individual multimedia unit connected to said bus system, to store the detected functional scope in said control unit memory, and to automatically display an operating menu responsive to a sum of the functional scope of said at least one individual multimedia unit connected to said bus system.

2. The multimedia system for a motor vehicle according to claim 1, wherein said individual multimedia unit memory is part of said at least one individual multimedia unit.

3. The multimedia system for a motor vehicle according to claim 1, including a computer unit with a computer unit memory, said computer unit spatially separated from said control unit, said display and input unit, and said at least one individual multimedia unit, connected through said bus system to said at least one individual multimedia unit.

4. The multimedia system for a motor vehicle according to claim 3, wherein said associated individual multimedia unit memory is formed to be writable with an altered functional scope in said computer unit.

5. The multimedia system for a motor vehicle according to claim 3, wherein said bus system has a prepared interface for disconnectably connecting said computer unit.

6. The multimedia system for a motor vehicle according to claim 1, wherein said control unit and said display and input unit are connected to one another for displaying operating menus required for operating the entire multimedia system on said display and input unit in accordance with a functional scope of the entire multimedia system and for operating the multimedia system with a plurality of displays in said display and input unit.

7. The multimedia system for a motor vehicle according to claim 1, wherein said display and input unit has individual keys allocated to associated operating functions of the multimedia system, and is subdivided into individual segments spatially associated with said individual keys and representing a particular operating function, and said control unit selects a display of the operating function in the various segments on the basis of the functional scope of the entire multimedia system.

8. The multimedia system for a motor vehicle according to claim 1, wherein said at least one individual multimedia unit generates audio data.

9. The multimedia system for a motor vehicle according to claim 1, wherein said at least one individual multimedia unit generates video data.

10. The multimedia system for a motor vehicle according to claim 1, wherein said at least one individual multimedia unit includes a DVD player.

11. The multimedia system for a motor vehicle according to claim 1, wherein said at least one individual multimedia unit includes a plurality of multimedia units that generate at least one of audio and multimedia data.

12. The multimedia system for a motor vehicle according to claim 1, wherein said at least one individual multimedia unit generates audio source data, and including a plurality of speakers, and a plurality of amplifier units for amplifying the audio source data, each of said plurality of amplifier units being spatially associated with and connected to at least one of said plurality of speakers for triggering only said plurality of speakers with specifically amplified audio source data.

13. The multimedia system for a motor vehicle according to claim 1, including a timer for tripping a formation of the functional scope of the entire multimedia system from the functional scope of said at least one individual multimedia unit after a predetermined period of time has elapsed.

14. The multimedia system for a motor vehicle according to claim 13, wherein the predetermined period of time for forming the functional scope of the entire multimedia system is adjustable.

15. The multimedia system for a motor vehicle according to claim 1, wherein the formation of the functional scope of the entire multimedia system is trippable from the functional scope of said at least one individual multimedia unit when said at least one individual multimedia unit is turned on.

16. The multimedia system for a motor vehicle according to claim 1, wherein said display and input unit trips an output of a status of the functional scope of at least one of the entire multimedia system and said at least one individual multimedia unit through said display and input unit.

17. The multimedia system for a motor vehicle according to claim 1, wherein said control unit trips the formation of the functional scope of the entire multimedia system from the functional scope of said at least one individual multimedia unit.

18. The multimedia system for a motor vehicle according to claim 1, wherein said control unit, said display and input unit, and said at least one individual multimedia unit are disposed in a mobile home.

19. The multimedia system for a motor vehicle according to claim 1, wherein said at least one individual multimedia unit is a plurality of individual multimedia units and each of said plurality of individual multimedia units are located in separate housings.

20. The multimedia system for a motor vehicle according to claim 1, wherein said at least one individual multimedia unit is a plurality of individual multimedia units each formed to automatically transmit the respective functional scope of each of said plurality of individual multimedia units stored in said associated individual multimedia unit memories over said bus system to said control unit and at least temporarily store the respective functional scope in said control unit memory.

21. The multimedia system for a motor vehicle according to claim 1, wherein said at least one individual multimedia unit is a plurality of individual multimedia units each formed to automatically transmit the respective functional scope of each of said plurality of individual multimedia units stored in said associated individual multimedia unit memories over said bus system to said control unit and continuously store the respective functional scope in said control unit memory.

22. A multimedia system for a house or an apartment, comprising:

a control unit with a control unit memory;

a display and input unit having a changeable operating menu for operating a multimedia system;

at least one individual multimedia unit with an associated individual multimedia unit memory containing a functional scope of said at least one individual multimedia unit; and a bus system connected to said control unit, said display and input unit, and said at least one individual multimedia unit, said control unit formed to detect the functional scope of said at least one individual multimedia unit connected to said bus system, to store the detected functional scope in said control unit memory, and to automatically display an operating menu responsive to a sum of the functional scope of said at least one individual multimedia unit connected to said bus system.

23. The multimedia system for a house or an apartment according to claim 22, wherein said at least one individual multimedia unit is a plurality of individual multimedia units and each of said plurality of individual multimedia units are located in separate housings.

24. The multimedia system for a house or an apartment according to claim 22, wherein said at least one individual multimedia unit is a plurality of individual multimedia units each formed to automatically transmit the respective functional scope of each of said plurality of individual multimedia units stored in said associated individual multimedia unit memories over said bus system to said control unit and at least temporarily store the respective functional scope in said control unit memory.

25. The multimedia system for a house or an apartment according to claim 22, wherein said at least one individual multimedia unit is a plurality of individual multimedia units each formed to automatically transmit the respective functional scope of each of said plurality of individual multimedia units stored in said associated individual multimedia unit memories over said bus system to said control unit and continuously store the respective functional scope in said control unit memory.

26. A method for defining a functional scope of a multimedia system, which comprises:

providing a control unit that provides control data, at least one individual multimedia unit for generating source data, an amplifier unit for amplifying the source data, at least one speaker, display and input unit for operating the multimedia system, and a bus system assuring transmission between the at least one individual multimedia unit and the control unit;

providing the control and the at least one individual multimedia units spaced apart from each other and providing the at least one individual multimedia unit with an associated memory representing a unit-specific functional scope of the at least one individual multimedia unit defining a variety of functions of the at least one individual multimedia unit;

transmitting the functional scope through the bus system to the control unit;

using the transmitted functional scope in the control unit at least partially for forming a functional scope of the entire multimedia system;

furnishing the control unit with a unit-specific functional scope from the memory associated with the at least one individual multimedia unit upon a modification of the multimedia system for generating source data and upon an attendant modification of the functional scope of the multimedia system;

at least partly combining the unit-specific functional scope into a new total functional scope of the entire multimedia system; and subsequently triggering the at least one individual multimedia unit with the control unit in accordance with the total functional scope, and allocating the generated source data to the at least one individual multimedia unit.

27. The method for defining the functional scope of a multimedia system according to claim 26, which comprises performing the step of modifying the multimedia system by adding a second individual multimedia unit.

28. The method for defining the functional scope of a multimedia system according to claim 26, which comprises supplying data from the control unit to the display and input unit in accordance with the total functional scope of the multimedia system for permitting a user of the multimedia system to individually adjust various parameters of the functions of the entire multimedia system.

29. The method for defining the functional scope of a multimedia system according to claim 28, which comprises selecting the parameters from the group consisting of volume, base, treble, fade, balance and equalize.

30. The method for defining the functional scope of a multimedia system according to claim 26, which comprises supplying data from the control unit to the display and input unit in accordance with the total functional scope of the multimedia system for permitting a user of the multimedia system to call up individual functions of the at least one individual multimedia unit for generating source data of the multimedia system.

31. The method for defining the functional scope of a multimedia system according to claim 30, which comprises selecting the individual functions to be called up from the group consisting of play, change track, repeat, fast forward, rewind, change frequency, change frequency band, mute, activate/deactivate traffic radio reports, start station scan, and activate/deactivate RDS functions, through operating menus.

32. The method for defining the functional scope of a multimedia system according to claim 26, wherein the step of providing at least one individual multimedia unit for generating source data generates source data type selected from a group consisting of audio and video data.

* * * * *